US010326779B2

(12) United States Patent
Yanovsky et al.

(10) Patent No.: US 10,326,779 B2
(45) Date of Patent: *Jun. 18, 2019

(54) REPUTATION-BASED THREAT PROTECTION

(71) Applicant: SONICWALL US HOLDINGS INC., Santa Clara, CA (US)

(72) Inventors: Boris Yanovsky, Saratoga, CA (US); Scott Eikenberry, Menlo Park, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,786

(22) Filed: Dec. 14, 2015

(65) Prior Publication Data

US 2016/0099959 A1  Apr. 7, 2016

Related U.S. Application Data

(63) Continuation of application No. 14/472,234, filed on Aug. 28, 2014, now Pat. No. 9,215,241, which is a (Continued)

(51) Int. Cl.
*G06F 17/00* (2006.01)
*G06F 15/16* (2006.01)
*G06F 9/00* (2006.01)
*H04L 29/06* (2006.01)
*G06F 21/55* (2013.01)
*H04L 12/58* (2006.01)
*G06F 16/955* (2019.01)

(52) U.S. Cl.
CPC ........ *H04L 63/1416* (2013.01); *G06F 16/955* (2019.01); *G06F 21/552* (2013.01); *H04L 51/22* (2013.01); *H04L 63/1408* (2013.01); *H04L 63/1425* (2013.01)

(58) Field of Classification Search
CPC . H04L 63/1416; H04L 51/22; H04L 63/1408; H04L 63/1425; G06F 17/30876; G06F 21/552
USPC .......................................................... 726/13
See application file for complete search history.

(56) References Cited

U.S. PATENT DOCUMENTS 7,475,118 B2   1/2009  Leiba
7,487,217 B2   2/2009  Buckingham
(Continued)

OTHER PUBLICATIONS

Ali Aydin Sel,cuk; A Reputation-based Trust Management System for P2P Networks;International Journal of Network Security, vol. 6, No. 3, pp. 235-245, May 2008.*
(Continued)

*Primary Examiner* — Monjur Rahim
(74) *Attorney, Agent, or Firm* — Polsinelli LLP

(57) ABSTRACT

Information concerning a plurality of identified threats provided by a plurality of preselected sources is stored in memory. An e-mail message may be received over a communication network. The received e-mail message is separated into a plurality of components. The stored information is searched to identify a reputation score associated with each of the plurality of components. It is then determined whether the e-mail is a threat based on the identified reputation score of each of the plurality of components. The determination is sent to a designated recipient.

20 Claims, 2 Drawing Sheets

Related U.S. Application Data continuation of application No. 13/210,324, filed on Aug. 15, 2011, now Pat. No. 8,910,279, which is a continuation-in-part of application No. 13/045,438, filed on Jun. 6, 2011, now abandoned.

(56) References Cited

U.S. PATENT DOCUMENTS

| | | | |
|---|---|---|---|
| 7,562,304 B2 | 7/2009 | Dixon | |
| 7,580,982 B2 | 8/2009 | Owen | |
| 7,610,344 B2 | 10/2009 | Mehr | |
| 7,644,008 B1 | 1/2010 | Issa et al. | |
| 7,668,951 B2 | 2/2010 | Lund | |
| 7,890,627 B1 | 2/2011 | Thomas | |
| 7,899,866 B1 | 3/2011 | Buckingham | |
| 7,921,063 B1* | 4/2011 | Quinlan | G06F 17/20 705/76 |
| 7,937,468 B2 | 5/2011 | Libbey | |
| 8,220,050 B2 | 7/2012 | Sarathy | |
| 8,407,786 B1 | 3/2013 | Elias et al. | |
| 8,880,611 B1* | 11/2014 | Lim | H04L 51/12 709/204 |
| 8,910,279 B2 | 12/2014 | Yanovsky | |
| 9,215,241 B2 | 12/2015 | Yanovsky | |
| 2005/0262209 A1 | 11/2005 | Yu | |
| 2006/0004896 A1 | 1/2006 | Nelson | |
| 2006/0168057 A1 | 7/2006 | Warren | |
| 2006/0253578 A1 | 11/2006 | Dixon et al. | |
| 2006/0253583 A1 | 11/2006 | Dixon | |
| 2006/0265747 A1 | 11/2006 | Judge | |
| 2007/0070921 A1* | 3/2007 | Quinlan | G06Q 10/107 370/254 |
| 2007/0078936 A1* | 4/2007 | Quinlan | G06Q 10/107 709/206 |
| 2007/0086592 A1 | 4/2007 | Ellison | |
| 2007/0107059 A1 | 5/2007 | Chasin et al. | |
| 2008/0082662 A1 | 4/2008 | Dandliker | |
| 2008/0126344 A1 | 5/2008 | Hoffman | |
| 2008/0208980 A1 | 8/2008 | Champan | |
| 2008/0282338 A1 | 11/2008 | Beer | |
| 2009/0037469 A1 | 2/2009 | Kirsch | |
| 2009/0063371 A1 | 3/2009 | Lin | |
| 2009/0064329 A1 | 3/2009 | Okumura et al. | |
| 2009/0222917 A1 | 9/2009 | Mills | |
| 2009/0259725 A1 | 10/2009 | Rabinovich | |
| 2009/0327430 A1 | 12/2009 | Colvin | |
| 2010/0011410 A1 | 1/2010 | Liu | |
| 2010/0017476 A1 | 1/2010 | Shue | |
| 2010/0082758 A1 | 4/2010 | Golan | |
| 2010/0212010 A1 | 8/2010 | Stringer et al. | |
| 2010/0217811 A1* | 8/2010 | Kay | H04L 51/12 709/206 |
| 2010/0251369 A1 | 9/2010 | Grant | |
| 2010/0251372 A1 | 9/2010 | Luck et al. | |
| 2010/0306846 A1 | 12/2010 | Alperovitch et al. | |
| 2012/0311703 A1 | 12/2012 | Yanovsky | |
| 2013/0247201 A1* | 9/2013 | Alperovitch | H04L 63/14 726/24 |
| 2014/0373141 A1 | 12/2014 | Yanovsky | |

OTHER PUBLICATIONS

Selcuk, Ali A., A Reputation-based Trust Management System for P2P Networks; International Journal of Network Security, vol. 6, No. 3, pp. 235-245, 2008.

U.S. Appl. No. 13/210,324 Office Action mailed Sep. 30, 2013.
U.S. Appl. No. 13/210,324 Final Office Action mailed Mar. 1, 2013.
U.S. Appl. No. 13/210,324 Office Action mailed Oct. 10, 2012.
U.S. Appl. No. 14/472,234 Office Action mailed Apr. 10, 2015.
"10 Sneaky Things a Spammer Will Do." Sonicwall, Jul. 16, 2009. (17 pages).
"Building a Better Spam Trap: choosing the best defense for tomorrow's emerging email threats." Sonicwall, 2009. (10 pages).
"The SonicWALL Grid Network: Collaborative Cross-vector Protection for Email Security." Sonicwall, 2008. (6 pages).

* cited by examiner

REPUTATION-BASED THREAT PROTECTION

CROSS-REFERENCE TO RELATED APPLICATIONS

The present application is a continuation and claims the priority benefit of U.S. patent application Ser. No. 14/472,234 filed Aug. 28, 2014, now U.S. Pat. No. 9,215,241 issued on Dec. 15, 2015, which is a continuation of and claims the priority benefit of U.S. patent application Ser. No. 13/210,324 filed Aug. 15, 2011, now U.S. Pat. No. 8,910,279 issued on Dec. 9, 2014, which is a continuation-in-part and claims the priority benefit of U.S. patent application Ser. No. 13/045,438 filed Jun. 6, 2011, which claims the priority benefit of U.S. provisional application 61/312,474 filed Mar. 10, 2010, the disclosures of which are incorporated herein by reference.

BACKGROUND OF THE INVENTION

Field of the Invention

The present invention generally relates to threat protection. More specifically, the present invention relates to reputation-based threat protection.

Description of the Related Art

Inbound spam volume continues to increase significantly, with no signs of abating. For example, in 2005, an average of 30 billion spam e-mail messages were sent daily. By 2007, that average had quadrupled to 120 billion daily spam messages. Assuming the effectiveness of a company's spam filter had remained the same that equates to a four-fold increase in spam reaching inboxes over a two-year period.

The incentive driving this global spam industry is profit. Despite the catastrophic impact on business productivity and network performance, and an increase in high-profile prosecutions of spammers, spam still works. Most spammers are salespeople who use unsolicited e-mail as an avenue to sell their products or services. Sending e-mail is inexpensive, and despite the general annoyance of spam messaging, some people do respond to spam advertisements. It this takes only a few responses for a spam ad to become profitable for the spammer. In one reported case, a spammer received only a 0.00036% response rate, but was still able to maintain a six-figure income by delivering tens of millions of e-mails a day. In another case, a one-month spam campaign for an herbal supplement took in over half a million dollars in sales. As such, the idea behind spam is to reach as many people as possible to increase the odds of finding even a few respondents. Spamming likewise works in the context of "pump and dump" stock schemes wherein spammers buy stock, generate spam-bot mailing drives to pump up share volumes (and the corresponding price of the stock), and then dump the stock at a profit.

Coordinated industry efforts to stem this ever-growing tide of spam have seen relatively fleeting victories. In 2008, for instance, industry pressure led to the upstream disconnection of the Internet Service Provider (ISP) McColo, causing an instant worldwide drop in spam by as much as 75%. Spam operations merely relocated to other ISPs, however, and spam volumes quickly recovered to their earlier levels. Spammers are constantly working to improve their effectiveness at getting past spam filters. Spam is constantly getting more sophisticated because spammers are typically technically savvy and early adopters of innovative technology.

Examples of innovative technologies include the use botnets, which is a collection of compromised computer systems that are under a common control structure. The compromised systems, called "zombies," can be directed to send out spam, phishing messages, viruses, and other malware. A computer can become a zombie through downloading a virus or Trojan in the form of executable attachments to e-mails and downloads on Web. A spam attack of millions of spam messages can be sent using a botnet. Each zombie may only send out 1,000 messages for a given attack, but with 10,000 zombies in a botnet, that is 10 million messages.

E-mails sent from zombie machines can appear to originate from the victim's computer and will steal computer resources to send the e-mails, which are often sent out en masse. These zombie machines can not only slow down network effectiveness, but also damage a company's reputation and require costly resources to purge the malicious code. Infected companies, too, face being blacklisted by their ISPs and subsequently are unable to send e-mail. There are an estimated 70 Million to 150 Million zombies active around the world. As many as 25% of computers on the Internet are estimated to be infected with botnets or zombies.

Moreover, when a zombie sends out a spam e-mail, it does so from an assigned Internet address: the sender IP address. Many spam filters rely on the reputation associated with a legitimate sender IP to block spam. To lessen the effectiveness of systems which rely on sender IP reputation, spammers may "borrow" IP addresses with good, or at least neutral, reputation. By limiting the number of spam messages a zombie sends, the spammer may be able to keep the IP address from getting a "bad" reputation.

Spammers may also buy access to a hacked e-mail server. The spammer may then quickly generate a high number of spam messages using the reputation of the company whose server has been hacked. As with the zombie situation, a system on a particular company network may be potentially compromising its sender IP reputation.

E-mail authentication tests the domain an e-mail says it is "from" to determine if the message is really from the IP address of the sending e-mail server. To work, it requires an organization to publish an SPF record, which tells e-mail receivers that a given IP address is allowed to send e-mail for a given domain. Strict set-up of an SPF record, however, means that third party services (e.g., an e-mail marketing company) typically cannot send e-mail on a company's behalf. As a consequence, many companies set up authentication, but leave open the option for other IP addresses to send e-mail (e.g., a third party marketing company). Opening other IP addresses also opens the door for spammers. Moreover, spammers can register domain names and set them up to authenticate properly and then send e-mail from them.

Another spamming technique involves the use of "word salad," which is when spammers add what appears to be random words to an e-mail message. The extra words to the e-mail are added to be read and evaluated by the recipients' spam filter. Generally, the extra words are considered "good" words (i.e., not typically found in a spam e-mail) according to most spam filters. As such, when the message is evaluated, there are now more "good" words than "bad" words (e.g., "enhance" and "love life"). If there are more good words than bad words, the spam filter may decide the message is good. Similarly, some e-mail spam messages contain more than extra words; they have entire sentences and paragraphs added to the message. The idea is to add in "good" words and phrases to the evaluation and the use of complete sentences attempts to make it harder to exclude these "good" words from the evaluation of the message content.

Generally, spam filters read e-mail looking for words and phrases it considers "bad" (i.e., indicative of spam) and if there is enough "bad" content, a message can be considered spam. A spammer may try to disguise the bad words and phrases from the filter but still make them readable to the recipient, on the hope that the recipient will want what the spammer is selling. The spammer therefore changes the size of fonts, making extraneous letters "disappear" (e.g., too small to be legible to the human eye) so that the recipient can easily read the message, while the spam filter sees only a line of gibberish.

Another strategy used by spammer is to use misspelled words in the hopes that the spam filter will not be able to understand the words. Many legitimate e-mails, however, may not necessarily use formal or correct spelling. Many people use slang, jargon, acronyms, abbreviations, and even IM and text messaging terms.

Optical illusions are also common using tricks to disguise "bad" words. In this case, the spammer uses symbols, special characters, and even alternate character sets to create the different variations. Using this method, it is estimated that there are over 600 quadrillion ways to spell "Viagra." Writing separate rules for each variation would be an extremely difficult and time-consuming task. Alternatively, a spammer may use spam images rather than text. Even where spam filters can recognize an image as being indicative of spam, the image may be altered so that it may look the same to a reader, but are not actually the same image. Small changes make the images different.

More recently, spammers have focused their attention on IP address reputation systems. As these types of systems have grown in popularity, spammers and hackers have increasingly focused their attacks on compromising legitimate mail severs at companies with good reputations, and cracking Web mail accounts at ISPs, such as Yahoo or Gmail. This allows spammers to avoid traditional IP reputation systems by sending bad mail from the servers of good businesses that have been compromised. Such tricks may cause spam to look and sound legitimate so the spam can get past the spam filter and into the recipient inbox. Because the sender is an actual person whose friends have likely whitelisted that sender e-mail account, spam sent using that e-mail account is likely to get past a spam filter. In a related trick, spammers may use the latest headlines as the e-mail subject. The headlines may not only add legitimacy to the e-mail, but also often raises the recipient's interest in opening the e-mail.

Phishing scams pose another significant threat. Distinct from other spam, phishing e-mails are specifically created to imitate legitimate e-mails, often copying actual corporate communication. Such phishing e-mails appear to be from a bank or other trusted source. The intent is to obtain account information related to financial accounts or other identity information. Billions of phishing e-mails are sent out every month, and these can lead to identity theft, security breaches, and financial loss and liability. Leveraging social engineering techniques to evade corporate security systems, criminals gain network access and steal confidential corporate data and financial assets. With the unwitting cooperation of an employee, network defenses such as firewalls, Intrusion Detection and Prevention systems and secure identification cards can become ineffective. Because phishing e-mails are designed to look like legitimate business correspondence, they consistently elude standard spam filters, and e-mail policies alone are an insufficient defense. Phishing defense requires specific analysis, identification and handling.

Some attacks rely on misrepresenting the content of the message. In some instances, spammers may attach real PDF or similar files to a message that contains the spam message. The actual e-mail body may say little, except perhaps something innocuous: "Joe, check this out" or "Q3 revenue forecast." Similarly, backscatter or NDR (non-deliverable-return) spam are messages that look like returned e-mails that could not be delivered to their intended sender. Spammers spoof such messages, attempting to bypass the e-mail security system.

Directory Harvest Attacks (DHAs) are exhaustive "brute force" attacks. DHAs bombard mail servers with e-mails sent to variations of possible e-mail addresses to check which ones bounce and which are legitimate. The extensive volume of a DHA strains e-mail infrastructures. In addition, DHAs acquire information on e-mail addresses for the company to be used later in follow-up, targeted spam, virus and phishing attacks. Similarly, Denial of Service (DoS) attacks are malicious attempts to bring down e-mail infrastructures. By sending an enormous volume of e-mail traffic into an organization at a coordinated time, attackers attempt to overwhelm the network and e-mail infrastructure, bringing e-mail to a complete stop.

Spammers will continually attempt to plague e-mail inboxes until it is no longer profitable for the spammer or there is a hack-proof prevention method that everyone uses. There is no singular technology that can stop all spam, and history has shown that when a given technology begins to work well, spammers attack it with a vengeance. Meanwhile, IT departments are left with having to allocate more resources to clean out swamped mailboxes, maintain key business communications and undo the damage done by newly emerging e-mail-borne threats.

Outbound threats are also becoming a top priority for IT administrators and CEOs, based upon fears of regulatory non-compliance and the leakage of sensitive intellectual property or confidential information. All organizations are faced with the challenge of meeting e-mail compliance requirements, whether regulatory compliance from government legislation, such as HIPAA, GLBA, or SOX; industry standards; or corporate compliance, such as preventing offensive e-mails or protecting intellectual property. Data leaks are not limited to malicious acts; most confidential data leaks are likely due to employee carelessness. With these various compliance requirements, encryption and archiving options alone are not enough. Organizations must have robust policy management and enforcement options to meet the range of compliance needs.

One recently adopted industry approach to anti-spam is Sender Identification (Sender ID). This technique authenticates the IP address of an external e-mail server that is making an inbound connection to the network to see if it matches the domain name of the e-mail sender. This assumes the sender has published a Sender Policy Framework (SPF) record and that the record is correctly set-up. There are two primary issues with this technique. First, spammers can create valid SPF records. Second, most companies do not like the restrictions Sender ID places their ability to have e-mail sent on their behalf. For example, using a third-party vendor to send e-mail messages to customers could cause an SPF failure.

Another inbound technique often attacked by spammers is Bayesian content analysis, which infers the probability of an e-mail being spam based upon combinations of specific individual words. Bayesian analysis can be a very powerful, but in practice, there is no universal definition for spam content, as each person has a different degree of tolerance and curiosity. Some companies try to train a Bayesian filter based on an organization's e-mail. This opens the door to Bayesian poisoning attack by spammers who place "good" content in spam messages in an attempt to skew the Bayesian scoring system. So while Bayesian content analysis is an excellent technique, by itself, it may not be able to meet the challenge of defending against today's pervasive spammers.

It is just as important to monitor and control outbound e-mail as inbound e-mail. Unfortunately, many small and midsize businesses choose to forego deploying outbound e-mail protection. This carries with it the highest risk of compromise of private or proprietary information. To lower that risk, many organizations have established and communicated written e-mail usage policies. While these written policies are a step in the right direction, best practice is to automatically analyze and enforce outbound e-mail polices in order to ensure compliance with internal and external regulations.

Over the years, spam has evolved from an annoyance to a serious threat to productivity and security. Inbound and outbound e-mail threats continue to proliferate at exponential rates. Simultaneously, e-mail-borne threats are also becoming more advanced. Increasingly, these more advanced threats blend spam, phishing, spyware, viruses, Trojans and other malware, into sophisticated blended attacks. As spam has evolved, traditional anti-spam systems have correspondingly evolved into more powerful and comprehensive e-mail security solutions.

The nature of spam is changing, incorporating a wide spectrum of e-mail-borne attacks that can stifle productivity, infect corporate networks and undermine corporate reputation and regularity compliance. In response, the nature of anti-spam defense is changing as well. Presently available single-point (single-technology) analytic solutions may not be sufficient to counter the constantly morphing forms of spam. Even multiple techniques, if they are not updated regularly, are not enough to keep spam at bay for long. Moreover, rigid scoring often ends up blocking e-mail that users actually want to receive. E-mail security solutions now require a sophisticated blend of technologies focused on both inbound and outbound protection.

There is, therefore, a need for improved systems and methods for threat protection from spam.

SUMMARY OF THE PRESENTLY CLAIMED INVENTION

Embodiments of the present invention include systems and methods for reputation-based threat protection. Information concerning a plurality of identified threats provided by a plurality of preselected sources is stored in memory. An e-mail message may be received over a communication network. The received e-mail message is separated into a plurality of components. The stored information is searched to identify a reputation score associated with each of the plurality of components. It is then determined whether the e-mail is a threat based on the identified reputation score of each of the plurality of components. The determination is sent to a designated recipient.

Various embodiments of the present invention include methods for reputation-based threat protection. Such methods include maintaining information provided by a plurality of preselected sources in memory concerning a plurality of identified threats, receiving an e-mail message over a communication network, executing instructions stored in memory, wherein execution of the instructions by a processor separates the received e-mail message into a plurality of components, searches the maintained information to identify a reputation score associated with each of the plurality of components, and determines whether the e-mail is a threat based on the identified reputation score of each of the plurality of components and sending information to a designated recipient regarding the determination whether the e-mail is a threat, the information being sent over the communication network.

Other embodiments of the present invention include non-transitory computer-readable storage media on which is embodied instructions executable to perform a method for reputation-based threat protection in general accordance with the method previously set forth above.

DETAILED DESCRIPTION

Embodiments of the present invention provide reputation-based threat protection. Information concerning a plurality of identified threats provided by a plurality of preselected sources is stored in memory. An e-mail message may be received over a communication network. The received e-mail message is separated into a plurality of components. The stored information is searched to identify a reputation score associated with each of the plurality of components. It is then determined whether the e-mail is a threat based on the identified reputation score of each of the plurality of components. The determination is sent to a designated recipient.

Anti-spam techniques generally break down into two groups: 1. reputation analysis and 2. content analysis. Reputation analysis is examining the reputation of many e-mail attributes, including the Sender IP Address, the content, the links/URLs, images, attachments, the e-mail's structure and more. Content analysis includes such techniques like Bayesian filtering, lexicographical distancing and image inference analysis, along with simpler checks like allow/block lists and SPF checks, are combined to thoroughly analyze an e-mail and dig out its true purpose.

Figure 1:
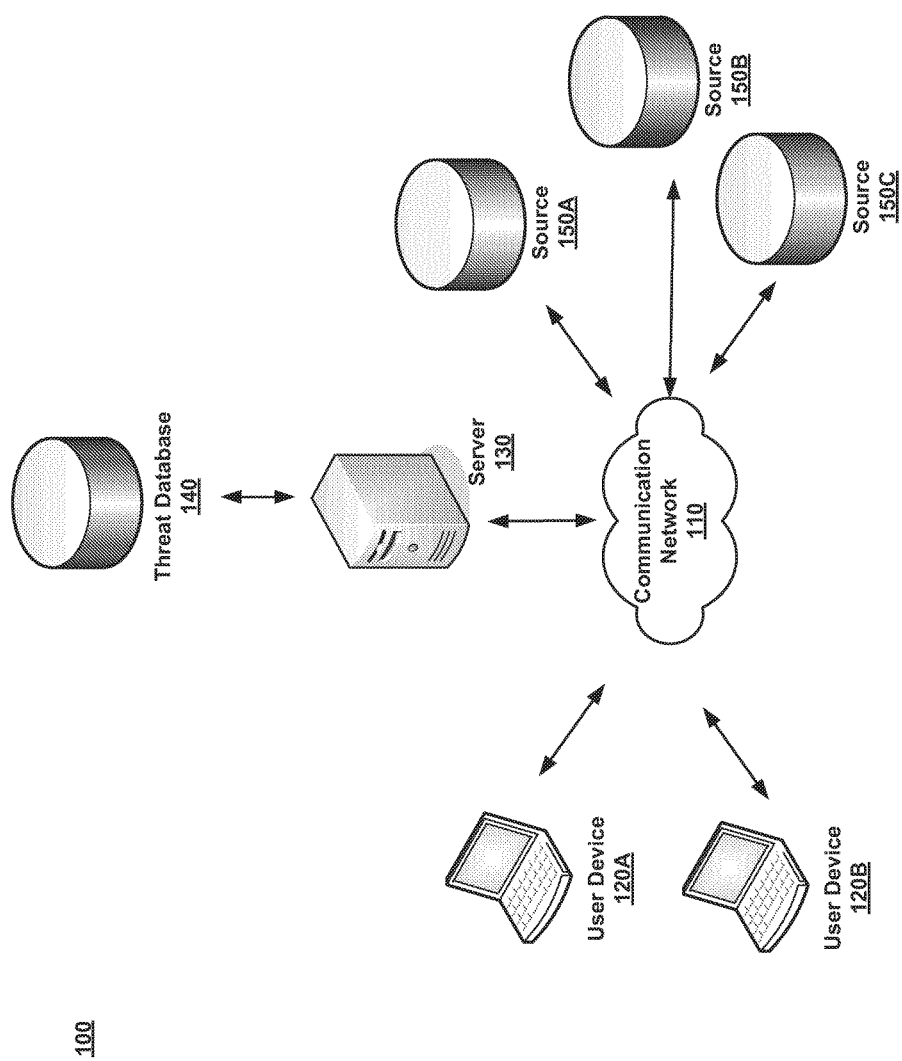
FIG. 1 illustrates an exemplary network environment in which a system for providing dynamic redemption codes may be implemented.

FIG. 1 illustrates an exemplary network environment 100 in which a system for reputation-based threat protection may be implemented. In network environment 100, one or more user devices 120A-B may be in communication with a server 130, via a communication network 110. Server 130 may also be in communication with one or more threat databases 140. In addition, one or more sources 150A-C may also communicate with the other devices in network environment 100 via communications network 110.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of environment 100.

Users may use any number of different electronic user devices 120, such as a general-purpose computer, portable computing devices (e.g., laptop, netbook, tablets), desktop computing devices, mobile phones, smartphones, personal digital assistants (PDAs), or any other type of computing device capable of communicating over communication network 110. Each user device 120 may also be configured to access data from other storage media, such as memory cards or disk drives as may be appropriate in the case of downloaded content. User device 120 may include standard computing components such as network and media interfaces, non-transitory computer-readable storage (memory), and processors for executing instructions that may be stored in memory.

Server 130 can receive and process communications sent by user devices 120A-B. Server 130 may include any computing device as is known in the art, including standard computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may also intercept and review e-mail sent by or to user devices 120A-B. Before the e-mail server is sent onto its destination, server 130 may evaluate the e-mail to determine whether it is spam or other unwanted e-mail (e.g., infected with virus, phishing). For example, user device 120A may wish to send e-mail to user device 120B. Server 130 may intercept the e-mail and evaluate it before allowing it to be sent to user device 120B. To facilitate the evaluation of the e-mail, server 130 of FIG. 1 may consult with a threat database 140. Databases 140 may be local or remote to the server 130. Further, the information in threat databases 140 may also be stored separately in different databases (e.g., based on type of threat) or aggregated in one database as illustrated in FIG. 1. Server 130 can access the stored data in the threat databases 140 and use that data, or information derived from or related to the same, to evaluate the e-mail. Conversely, the server 130 may receive information from user devices 120A-B or sources 150A-C and store the same in threat database 140. The server 130 can later access data stored in any of database 140 for various purposes including evaluating subsequent e-mails.

Upon receiving an e-mail for evaluation, server 130 may separate the e-mail into components. For example, components of an e-mail may include metadata, such as sender e-mail address or IP address, and content from the e-mail (e.g., text, images, attachments). Moreover, components may also include different combinations of content. Each component may further be processed (e.g., to create a signature (e.g., thumbprint). Such thumbprints may not only include current reputation information on Sender IP addresses, but also all significant components of the message, including message structure, content, embedded URLs, images, attachments and other factors. Server 130 may determine, based on such thumbprint information in threat database 140, what reputation score is associated with each of the components. Based on the combination of reputation scores for each of the components of the e-mail, server 130 may determine whether the e-mail represents a threat.

Threat database 140 may include information related to e-mails that were previously identified as threats. Any type of e-mail information may be stored in threat database 140, including any component that can be extracted from an e-mail message. Moreover, each component may be associated with a unique thumbprint for easy identification. Such thumbprint may be generated by hashing, or any equivalent process for producing unique identifiers. Each component is further associated with a reputation score. The reputation score may have accumulated or aggregated over time based on votes from preselected sources. The preselected sources include trusted businesses, partners, or experts who have evaluated previous e-mails and identified such e-mails as spam. The components of each e-mail (and associated thumbprints) may then be associated with a vote for spam. In some embodiments, a source 150 may be limited to one vote per thumbprint per day. Sources 150A-C may also vote anonymously in some instances.

Sources 150A-C may be associated with any trusted users, clients, "honey pots" (i.e., e-mail addresses and domains placed throughout the internet worldwide to collect spam, phishing and virus e-mails), real-time blacklists (RBL) providers, Web rating analysts (e.g., SonicLabs), individual contributing industry professionals, security/spam specialists, or any party designated as being trusted to provide accurate characterization of spam. These sources 150A-C collect, identify, define and transmit information on multiple vector components to server 130 for compilation and analysis, applying unique processes and criteria. Sources 150A-C may be similar to user device 120 with respect to such standard computing components such as network and media interfaces, non-transitory computer-readable storage (memory), and processors for executing instructions that may be stored in memory. Sources 150A-C allows a trusted entity to communicate information regarding spam messages that may be used to further evaluate subsequent e-mail messages.

Server 130 may therefore collaboratively gather, analyze and vet cross-vector threat information from millions of business-oriented sources around the world. Reputation based threat protection information is then distributed securely, anonymously and in real time to improve the overall effectiveness of e-mail security solutions. Due to the distributed nature of this network and the use of multiple different data sources, the evaluation from one contributor can be vetted against multiple other contributors, allowing collaborative filtering process to be highly accurate and fully self-correcting.

Such collaborative filtering avoids having to rely upon rented or purchased lists from Internet Service Providers (ISPs). As such, dynamically up-to-date e-mail component reputation analysis contribute to and take advantage of global threat monitoring information, in order to provide users 120A-B with comprehensive and responsive security solutions.

Historically, security solutions have often grouped threats by vectors corresponding to particular ports by which suspect traffic might breach the network perimeter (e.g., the e-mail vector would relate to traffic over Port 25, the Web vector to traffic over Port 80). Server 130, however, may collect, analyze, and distribute "cross-vector" threat-related information between security systems, to enable a more intelligently collaborative and comprehensive response. For instance, an e-mail message might contain a URL that has been defined as suspect. Using a cross-vector approach, server 130 can block browser access to the URL over Port 80 on the Web vector, as well as blocking access to the message over Port 25 on the e-mail vector. Each component of a vector can receive independent analysis and filtering. For example, a single e-mail message could be broken down into the components of sending IP address, text content, e-mail structure, URL links, file attachments, embedded images. Individually, any of these components might be a recognized as a threat, and considered to have a "good" or "bad" reputation.

The GRID Network creates reputation scores for vector components through collaborative filtering. Collaborative filtering refers generally to the process by which a community made up of multiple business-focused sources shares information on identified threats, in order to collaboratively define suspect vector components that should be blocked or filtered. In the case of e-mail security, the reputation of components may be determined through the compilation and weighting of junk and unjunk "votes." When an e-mail is disassembled, each component may be encrypted using a non-reversible hash process to create a "thumbprint" of that component. These thumbprints may then sent be to the data center with a corresponding reputation of good or bad, and tabulated in real time. Every transmission may be encoded over HTTPS, using the DES/AES encryption of the browser. Each user or source may only be allowed to submit one vote per thumbprint per day for consideration. For example, if the same URL is determined to be bad by an Anti-Spam Desktop user in New York and another Anti-Spam Desktop user in Beijing, each user anonymously may enter a single individual vote. This prohibits spammers from "gaming" the system and keeps inputs from any system from skewing the reputation scores.

Votes may be tallied in a data sequencing process at server 130, where they are compiled and vetted against votes from all other sources 150A-C. At any given time, there may be millions of thumbprints in the threat database 140 compiled with collaboration from millions of sources 150A-C. Server 130 may gather and vet millions of e-mails per day from "honey pots" designed as bait e-mail addresses or domains for spam and phishing attacks. Server 130 may disassemble these collected "honey pot" e-mails into constituent thumbprints, and adds them as junk votes. Server 130 may also use information provided by real-time blacklist providers and individual industry professionals to contribute to the reputation vetting process. Server 130 may further provide ambiguous e-mails for further evaluation by analysts to add an additional layer of checks-and-balances.

When an e-mail is received by server 130, one of the checks may be to break down the e-mail into its component parts (e.g., and/or generate thumbprints thereof) and to determine the reputation of each component from the threat database 140. If one or more components are flagged as junk, the e-mail may be identified as having a reputation of junk. To keep the threat database 150 current, updates (e.g., from sources 150A-C) may be received and automatically applied periodically. These updates allow for maximization of collaborative power with minimal administration.

Collaborative filtering further incorporates a self-correcting human element. For example, server 130 may recognize that a particular IP address has transmitted a spam e-mail. However, the sender of the e-mail from that IP address may be known to a source 150A-C as legitimate, and having a good reputation. By vetting the evaluation from one source 150A-C against evaluations from multiple other sources 150A-C regarding this particular IP address and sender, a broader statistical sample may be established, and a more accurate reputation score can be determined. This comprehensive vetting process may be applied not only to IP addresses, but to all thumbprint types.

Relying upon rented or purchased lists from consumer-based Internet Service Providers (ISPs) may have limited value, as such lists may be easily "gamed" and as such, may not be as accurate as opinions from sources 150A-C that may be selected based on expertise and accuracy. In addition, active mechanisms for tracking and responding to virus- and spyware-related information may be included. Using the dynamically-updated threat database 140 and its extensive list of malware thumbprints, most common threats may be automatically blocked. As such, users may be prevented from downloading e-mail containing spyware and stops any existing spyware from being disseminated via e-mail systems. Such functions can be further augmented by optional anti-virus subscriptions and subscriptions for continual signature updates (e.g., from McAfee and Kaspersky Lab). Subscription information may be automatically distributed, along with internally-defined thumbprints, at periodic intervals of time. In addition to information regarding spam and viruses, URLs of suspect Web sites may also be tracked in threat database 140.

In some instances, server 130 may conduct deep packet inspection (DPI) on a packet received from a particular IP address to determine whether that packet contains a virus. Potentially, that information could contribute to the reputation of that IP address. Likewise, server 130 may be useful in identifying suspect distribution patterns that could be used in tracking and blocking sophisticated, automated multi-prong attacks. Server 130 may scan content in every significant e-mail component (body, subject, attachments) to assure compliance with corporate policy, and can block or re-route noncompliant e-mails to appropriate LDAP-based groups or individuals. Scanning content may utilize any adversarial Bayesian analysis including advanced text and image parsing engines, lexicographical distancing, image analysis (e.g., white-on-white, teeny fonts), gibberish detection, and corporate or user allow/block lists. Bayesian fraud content analysis may also be used to differentiate and isolate phishing fraud from spam during the filtering process.

Using the dynamically updated threat database 140 and its extensive list of signatures/thumbprints, threats, as well as time-zero attacks, may be prevented. Users may also be prevented from downloading spyware and stops any existing spyware from being disseminated via e-mail systems. Robust anti-zombie defense may be provided through identifying and blocking zombie-generated e-mail and alerting the administrator to potentially infected machines. A multiple-diagnostic approach, combined with flexible response options, may enable enterprises to prevent zombie damage while allowing the company to send legitimate outgoing e-mails. Zombie detection may employ multiple indicators to locate these dangerous machines and stop the transmission of e-mail threats. These indicators include machines sending out spam, phishing or virus e-mails; e-mails sent from addresses not in the company's LDAP address list; and high e-mail volumes sent from individuals or corporate-wide. The administrator can select how to respond to actions flagged as zombie machine indicators. For example, the e-mail messages can be deleted or quarantined, or an alert can be sent to a designated recipient. If "Outbound Safe Mode" is initiated, alerts may be sent at periodic intervals, dangerous attachments may be prevented from being sent, and outbound messages with potentially dangerous attachments (e.g., executable program files) may be optionally deleted or quarantined.

In addition to the signatures/thumbprints in threat database 140, server 130 may further utilize a policy engine and compliance services to identify, route and report on compliance-related information entering or leaving the organization via e-mail. Such services may include compliance dictionaries, record-ID matching, compliance reports, archiving, encryption, and approval boxes with alerts. Record-ID matching searches for predefined patterns (e.g., social security numbers, bank routing numbers, credit card numbers) for easy-to-use Web-based, UI-enabled custom record searches. Attachment scanning looks for content within attachments (e.g., Word, PowerPoint, PDF and over 300 other file types) to ensure sensitive data does not leave within attachments. Predefined policies provides common compliance setups. Predefined Dictionaries help in handling health or financial records to monitor for regulatory (e.g., HIPAA, SOX, GLBA) violations and, used in conjunction with record ID matching, ensure the protection of confidential information and prevention of sensitive data leaks. Approval boxes allow viewing and approval of e-mails that potentially violate compliance policies before they leave the organization. E-mail archiving is available for both inbound and outbound e-mail traffic on the same server or appliance. Additionally, organizations can route e-mails that match a specific policy to an external archive. Encryption routing directs e-mails that match a specific policy to an encryption/decryption server. Coupled with Transport Layer Security (TLS), a free standards-based gateway-to-gateway encryption protocol, secure communication of confidential information may be ensured. As such, organizations may be able to meet both external (e.g., PCI, SOX, HIPAA) and internal (e.g., intellectual property policy) needs and requirements. Server 130 may therefore be able to intelligently monitor for compliance, identify e-mails that violate compliance policies, applying multiple enforcement actions, and report on the same.

Based on evaluation of e-mail, server 130 may initiate a variety of corresponding actions (e.g., bounce, route to, notify). These policies can be applied company-wide or to specific users or LDAP-based groups. Administrators can then monitor the impact of a particular policy by placing all e-mails that match the policy in a named Approval Box for review. In some embodiments, users are provided with a single e-mail that summarizes all of their quarantined spam, virus and phishing e-mails. That e-mail may also includes single-click access to "unjunk" message types permitted by IT, delivering them to the employee's inbox, and allowing the senders to be added to the user's personal allowed list. This summary e-mail ensures that employees never miss a legitimate message and never need to contact IT to find the message. Users can preview messages in "safe mode," which can prevents the user from seeing offensive content and prevent the execution of Java, JavaScript or any other potentially malicious code. Users may also be provided a personal junk box, which they can access through a simple Web interface. From here, users can search, sort, and review e-mail determined to be junk. Then, with a single-click of the "unjunk" option, users can have mail delivered seamlessly to their inbox and have the sender added to their personal allowed list. The junk box itself may be kept at the perimeter (e.g., off the e-mail server), thereby decreasing risk and load. An administrator can also enable end-user access to a junk-button for e-mail client (e.g., Outlook) plug-in. If allowed, a user can download this lightweight plug-in and install it on their user device. The junk button will display whenever the e-mail client is running and, when used, will not only remove the selected spam message from the user's inbox, but also send the user's "junk" vote immediately and anonymously for storage in the threat database 140, collaborating in a global-community-based solution to stopping spam.

In any notification to administrators, server 130 may provide clarification as to categorization actions to explain why a specific message was classified as spam, likely spam or non-spam. This feature allows administrators to fine-tune their system to block spam while minimizing false positives. In the rare case of a false positive or false negative, the administrator can use the information provided by server in the notification to determine why a specific e-mail was or was not blocked.

Multi-LDAP and user list support may also be provided as a flexible solution for distributed organizations or managed service providers (MSPS). These types of deployments typically need to connect to multiple LDAP servers, or have a User List of valid users for a given domain where LDAP services are not available. Dynamic synchronization with existing LDAP servers may ensure any modifications made by administrators are automatically reflected in filtering activity in real time. Synchronization may be enabled with nearly any corporate directory, including Exchange 5.5, Active Directory, Lotus, iPlanet and OpenLDAP.

Figure 2:
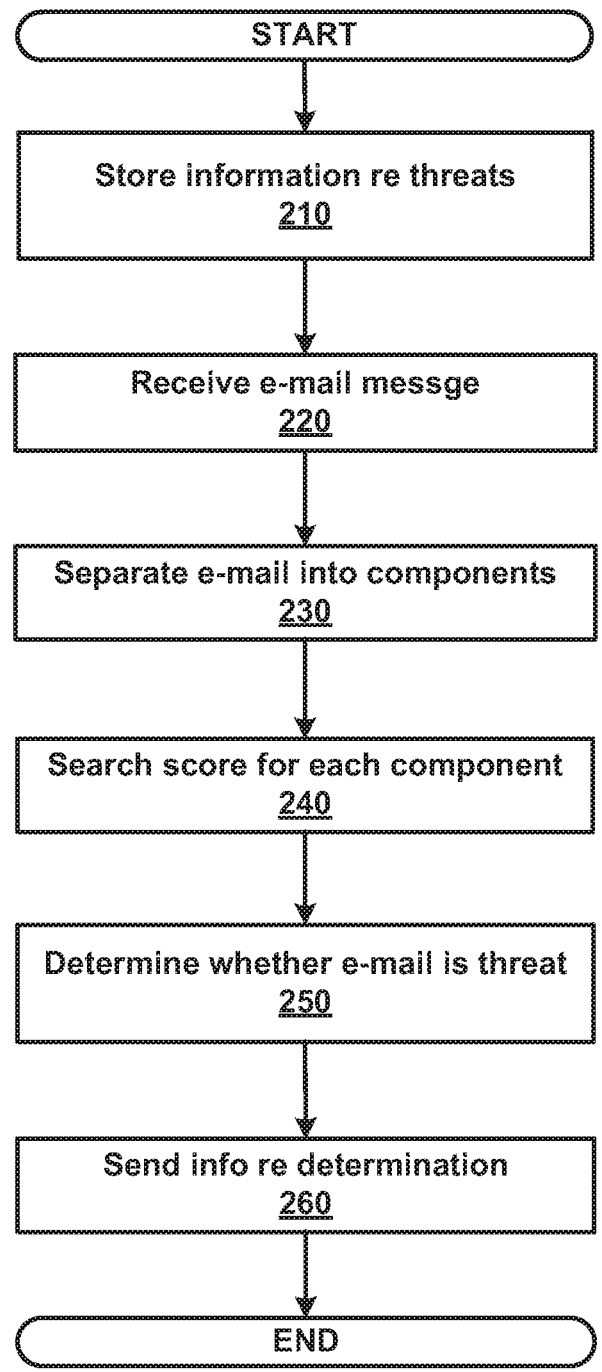
FIG. 2 is a flowchart illustrating an exemplary method for providing dynamic redemption codes.

FIG. 2 is a flowchart illustrating an exemplary method 200 for providing reputation-based threat protection. The method 200 of FIG. 2 may be embodied as executable instructions embodied in a computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 as illustrated in FIG. 2, information is stored regarding a plurality of identified threats. The maintained information was provided by a plurality of preselected sources. An e-mail message is received over a communication network. The received e-mail message is separated into a plurality of components. The maintained information is searched to identify a reputation score associated with each of the plurality of components. It is determined whether the e-mail is a threat based on the identified reputation score of each of the plurality of components, and information is sent to a designated recipient regarding the determination whether the e-mail is a threat.

In step 210, information is maintained in threat database 140. Threat databases 140 may encompass one or multiple databases for storing information regarding e-mail and e-mail threats (e.g., spam, phishing e-mails, viruses/malware, noncompliant e-mails). Such information may include reputation scores, which may be based on votes provided by any of the sources 150A-C that have been preselected based on such factors as expertise and accuracy. Threat databases 140 may collectively serve as a repository for information used to identify e-mail threats.

In step 220, an e-mail message is received over communication network 110. Specifically, a sender user device (e.g., user device 120A) may send an e-mail message addressed to a recipient. The e-mail message is intercepted and received at server 130, however, for evaluation before being allowed to be sent to the recipient.

In step 230, the received e-mail is separated into components. Server 130 reviews the contents of intercepted e-mail message and breaks the contents down into various components. A message body, for example, may include text and images. The text may be broken down into any combination of words or parts of words. Similarly, the image may be broken down into smaller groups of pixels. Other parts of the message may be broken down similarly, including metadata, sender information, and/or recipient information.

In step 240, a reputation score is identified for each component. Server 130 consults threat database 140 and determines whether each component exists in threat database 140. Further, if a component does exist in threat database 140, that component may be associated with a reputation score. If a particular component does not exist in threat database 140, it may be added and assigned a reputation score. The assigned reputation score may be based on evaluating the reputation scores of the other components in the same message.

In step 250, it is determined whether the e-mail is a threat. Server 130 has identified a reputation score for each component in the message that exists in threat database 140. For example, a message may have been broken down into 100 components including text components, image components, metadata components, and address components. There may be 90 components that have a reputation score indicative of spam, 5 components that have a reputation score that is not indicative of spam, and 5 components that do not exist in threat database 140. Based on such scoring, server 130 may determine that the e-mail is indeed a threat. In some instances, the 5 components that do not exist in the threat database may be assigned a reputation score that is also indicative of spam (e.g., an average of the reputation scores of the other 95 components).

In step 260, information regarding the determination is sent to a designated recipient. In some embodiments, the designated recipient may be a system administrator tasked with following up regarding further analysis or activity. For example, the administrator may need to evaluate the sender device to see whether it has been hacked or become a zombie device.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for reputation-based threat protection, the method comprising:
    receiving, from one or more databases, information concerning a plurality of identified threats from a plurality of selected sources;
    executing instructions stored in memory, wherein execution of the instructions by a processor:
        identifies one or more components of an intercepted e-mail message, wherein the intercepted e-mail message was received over a first network communication interface,
        reviews the one or more components to associate, using the received information, one or more reputation scores with the intercepted e-mail message,
        identifies the intercepted e-mail message as a threat based on the one or more reputation scores associated with the e-mail message
        blocks access to a universal resource locator (URL) included in the intercepted e-mail according to at least a first threat vector, and
        blocks access to the e-mail message according to at least a second vector; and
    providing a notification that the e-mail message was identified as a threat.

2. The method of claim 1, wherein the first vector corresponds to a first port for accessing the URL and the second vector corresponds to a second port.

3. The method of claim 1, wherein a signature is generated from the one or more components of the intercepted e-mail message.

4. The method of claim 1, wherein information corresponding to the intercepted e-mail message is transmitted to a data center.

5. The method of claim 4, wherein the information corresponding to the intercepted e-mail message is encoded and is transmitted to the data center according to a secure hypertext transfer protocol (HTTPS).

6. The method of claim 5, wherein the information corresponding to the intercepted e-mail message is encoded according to at least one of a data encryption standard (DES) or an advanced encryption standard (AES).

7. The method of claim 1, wherein the first network communication interface corresponds to at least one of an interface associated with outgoing e-mail traffic or a communication interfaces associated with incoming e-mail traffic.

8. A non-transitory computer readable storage medium having embodied thereon a program executable by a processor for performing a method for reputation-based threat protection, the method comprising:

receiving, from one or more databases, information concerning a plurality of identified threats from a plurality of selected sources;

identifying one or more components of an intercepted e-mail message, wherein the intercepted e-mail message was received over a first network communication interface;

reviewing the one or more components to associate, using the received information, one or more reputation scores with the intercepted e-mail message;

identifying the intercepted e-mail message as a threat based on the one or more reputation scores associated with the e-mail message;

blocking access to a universal resource locator (URL) included in the intercepted e-mail according to at least a first threat vector;

blocking access to the e-mail message according to at least a second vector; and providing a notification that the e-mail message was identified as a threat.

9. The non-transitory computer readable storage medium of claim 8, wherein the first vector corresponds to a first port for accessing the URL and the second vector corresponds to a second port.

10. The non-transitory computer readable storage medium of claim 8, wherein a signature is generated from the one or more components of the intercepted e-mail message.

11. The non-transitory computer readable storage medium of claim 8, wherein information corresponding to the intercepted e-mail message is transmitted to a data center.

12. The non-transitory computer readable storage medium of claim 11, wherein the information corresponding to the intercepted e-mail message is encoded and is transmitted to the data center according to a secure hypertext transfer protocol (HTTPS).

13. The non-transitory computer readable storage medium of claim 12, wherein the information corresponding to the intercepted e-mail message is encoded according to at least one of a data encryption standard (DES) or an advanced encryption standard (AES).

14. The non-transitory computer readable storage medium of claim 8, wherein the first network communication interface corresponds to at least one of an interface associated with outgoing e-mail traffic or a communication interfaces associated with incoming e-mail traffic.

15. A system for reputation-based threat protection, the system comprising:

one or more databases; and at least one server communicatively coupled to the one or more databases, wherein the at least one server comprises:

a communication interface that receives from one or more databases, information concerning a plurality of identified threats from a plurality of selected sources; and a processor that executes instructions stored in memory, wherein execution of the instructions by a processor:

identifies one or more components of an intercepted e-mail message, wherein the intercepted e-mail message was received over a first network communication interface, reviews the one or more components to associate, using the received information, one or more reputation scores with the intercepted e-mail message, identifies the intercepted e-mail message as a threat based on the one or more reputation scores associated with the e-mail message, blocks access to a universal resource locator (URL) included in the intercepted e-mail according to at least a first threat vector, and blocks access to the e-mail message according to at least a second vector, wherein the communication interface provides a notification that the e-mail message was identified as a threat.

16. The system of claim 15, wherein the first vector corresponds to a first port for accessing the URL and the second vector corresponds to a second port.

17. The system of claim 15, wherein a signature is generated from the one or more components of the intercepted e-mail message.

18. The system of claim 15, wherein information corresponding to the intercepted e-mail message is transmitted to a data center.

19. The system of claim 18, wherein the information corresponding to the intercepted e-mail message is encoded and is transmitted to the data center according to a secure hypertext transfer protocol (HTTPS).

20. The system of claim 19, wherein the encoding of the information corresponding to the intercepted e-mail message is encoded according to at least one of a data encryption standard (DES) or an advanced encryption standard (AES).

* * * * *